J. A. BENTZ.
LUG.
APPLICATION FILED AUG. 9, 1921.
1,402,562.
Patented Jan. 3, 1922.
2 SHEETS—SHEET 1.
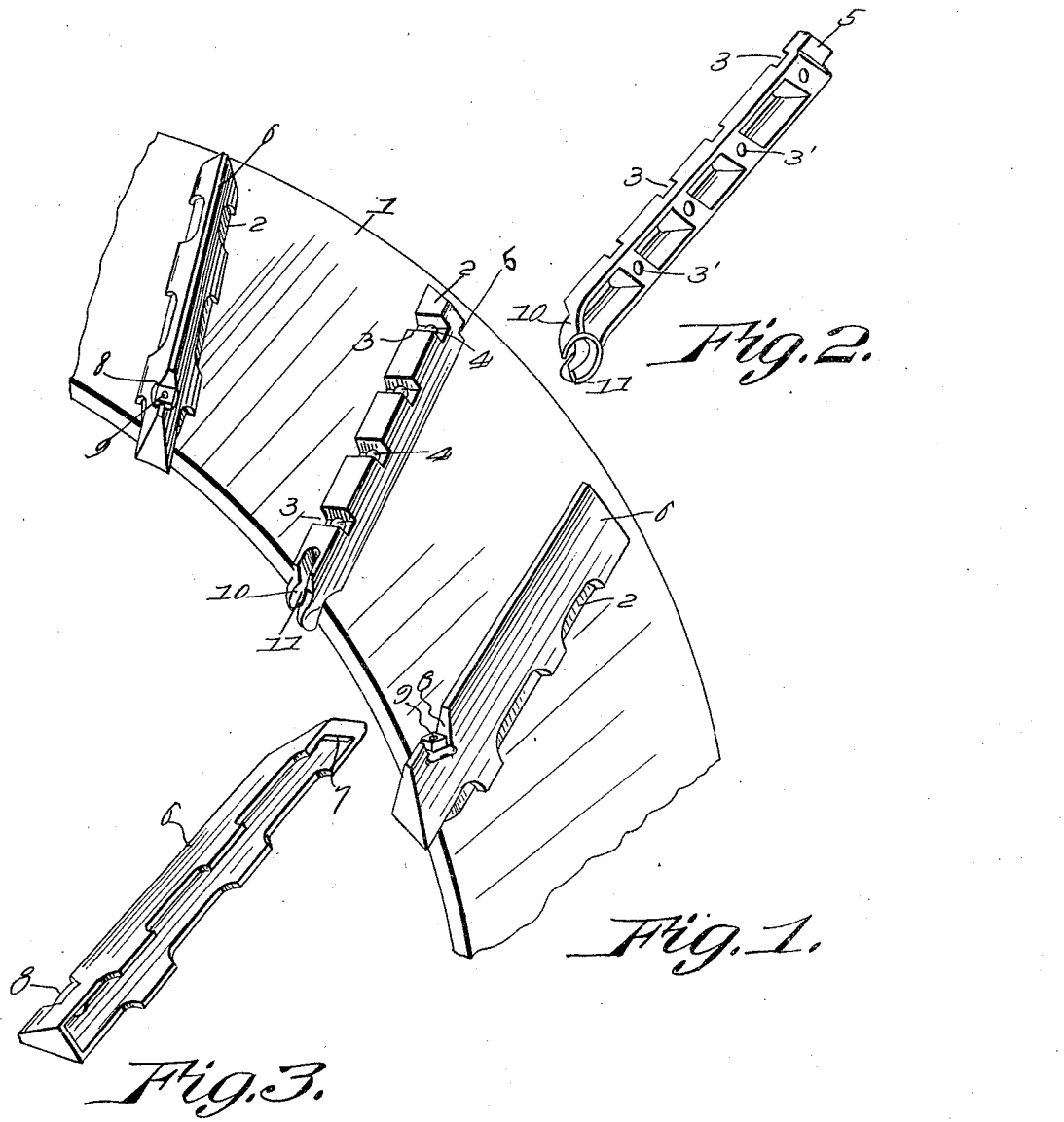
Inventor
John A. Bentz,
By George A. Pinnuck
Attorney

J. A. BENTZ.
LUG.
APPLICATION FILED AUG. 9, 1921.

1,402,562.

Patented Jan. 3, 1922.
2 SHEETS—SHEET 2.

Inventor
John A. Bentz,
By George A. Pruvot
Attorney

UNITED STATES PATENT OFFICE.

JOHN A. BENTZ, OF HARRISBURG, PENNSYLVANIA, ASSIGNOR OF ONE-HALF TO WALTER S. SCHELL AND ONE-HALF TO BESSIE M. BENTZ, BOTH OF HARRISBURG, PENNSYLVANIA.

LUG.

1,402,562.        Specification of Letters Patent.        Patented Jan. 3, 1922.

Application filed August 9, 1921. Serial No. 490,939.

*To all whom it may concern:*

Be it known that I, JOHN A. BENTZ, a citizen of the United States, residing at Harrisburg, in the county of Dauphin and State of Pennsylvania, have invented certain new and useful Improvements in Lugs; and I do hereby declare the following to be a full, clear, and exact description of the invention, such as will enable others skilled in the art to which it appertains to make and use the same.

My invention consists in certain new and useful improvements in traction lugs of the detachable type, and its object is to provide a crown lug which is adapted to be secured to and over a highway cleat which is bolted or otherwise secured to the wheel of the tractor or other vehicle.

Another object of my invention is to provide a lug which may be removably secured in position by a single bolt, thus making the operation of attaching and detaching the lug, quite simple.

Still another object of my invention is to provide a tractor wheel with a set of highway cleats permanently secured thereto, and a set of crown lugs which are adapted to be applied to and removed from said cleats, thus producing a change of traction surface very readily, and while it gives the user two complete sets of cleats, it is only necessary for him to handle one outfit, as the highway cleats are never removed, except for replacement, and are considered in effect, as part of the tractor wheel.

With the above and other objects in view which will appear as the description proceeds, the invention consists in the novel features herein set forth, illustrated in the accompanying drawings, and more particularly pointed out in the appended claims.

In the drawings,

Fig. 1 is a view of my improved lug in place on a tractor wheel, showing the highway cleat before the lug is attached.

Fig. 2 is a perspective view of the highway cleat, detached from the wheel.

Fig. 3 is a perspective view of the crown lug detached.

Figure 4:
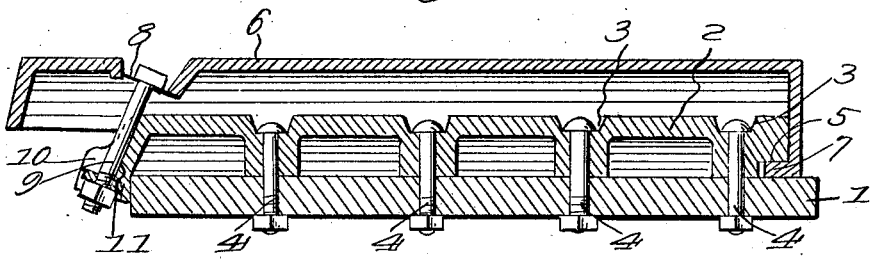
Fig. 4 is a cross sectional view of the highway cleat with the crown lug in place thereon.
Figure 5:
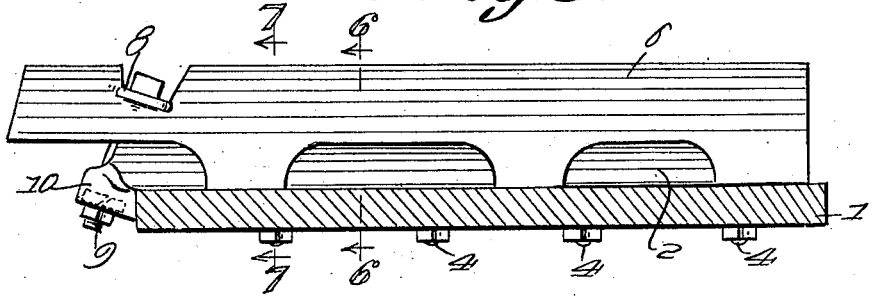
Fig. 5 is a side view thereof.
Figure 6:
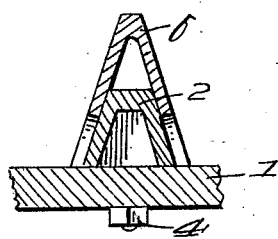
Fig. 6 is a sectional view taken on line 6—6 of Fig. 5.
Figure 7:
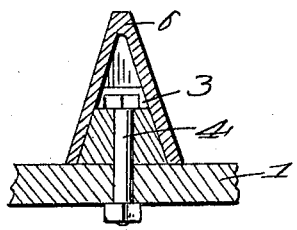
Fig. 7 is a sectional view taken on line 7—7 of Fig. 5.

In the drawings like numerals designate the same parts throughout the several views. 1 designates the rim of an ordinary tractor wheel, 2 is a highway cleat, which is preferably made of cast metal and is adapted to be secured to the tractor wheel by means of the bolts and nuts 4, which engage the cleats at the recesses 3 and pass through the openings 3′.

These cleats are placed on the wheel preferably in diagonal position and the ends are formed parallel with the edge of the wheel. At one end of each cleat there is provided a recess 5, adapted to engage the rib portion 7 of the crown lug 6. The other end is provided with a slotted ear 10, formed with a recessed portion 11 to receive the bolt 9.

The crown lug 6 is made of similar material to that of the cleat 2 and is formed wedge-shape in cross section and is recessed on its under side to fit over the highway cleat 2.

At one end of this lug there is provided a rib portion 7 which extends across the entire width of the lug and engages the recess 5 in the cleat 2, and secures the end of the lug in place. At the other end of the lug is a recess 8 adapted to receive the head of the bolt 9 which passes through the lug and the slotted ear 10 of the cleat, and secures the two together.

Under ordinary circumstances and for use on the road, the highway cleat 2 is all that is necessary, but when the tractor is to be used on soft ground and when greater traction is needed, the crown lug is put in place by first inserting the rib 7 in the recess 5 of the cleat, and then lowering the other end of the lug so that the recess 8 coincides with the recess 11 in the ear 10. The bolt 9 is then inserted through the two recesses 8 and 11 and a nut and lock washer placed thereon which are housed by the recess 11.

From the foregoing, I believe that the construction, operation and advantages of my invention may be clearly understood without further description and in conclusion I may state that the details of construction may be modified considerably without departing from the spirit of the invention as set forth in the following claims.

What I claim and desire to secure by Letters Patent is:—

1. The combination with a tractor wheel, of a cleat secured thereto, a supplementary traction lug adapted to fit over said cleat and means provided at the ends of said cleat, independent of the wheel rim for removably securing said supplementary lug to the cleat.

2. The combination with a tractor wheel, of a cleat secured thereto, a crown lug adapted to fit over said cleat and means for securing said crown lug to the cleat, said means consisting of a rib and recess engaging one another, at one end of the device and a bolt and nut construction at the other end thereof.

3. The combination with a tractor wheel, of a cleat removably secured thereto, one end of which is provided with a recess and the other end with a slot, of a crown lug provided at one end with a rib portion to engage the recesses of the cleat and at the other end with a bolt and nut construction to engage the slot.

In testimony whereof I affix my signature.

JOHN A. BENTZ.